(12) United States Patent
Shan et al.

(10) Patent No.: US 8,289,903 B2
(45) Date of Patent: Oct. 16, 2012

(54) METHOD AND APPARATUS FOR FRAME BASED RESOURCE SHARING IN COGNITIVE RADIO COMMUNICATION SYSTEM

(75) Inventors: Cheng Shan, Suwon-si (KR); Sang-Bum Kim, Seoul (KR); Eun-Taek Lim, Suwon-si (KR); Jung-Soo Woo, Suwon-si (KR); Geun-Ho Lee, Suwon-si (KR); Yong-Ho Park, Cheonan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 642 days.

(21) Appl. No.: 12/501,085

(22) Filed: Jul. 10, 2009

(65) Prior Publication Data
US 2010/0009692 A1 Jan. 14, 2010

(30) Foreign Application Priority Data
Jul. 10, 2008 (KR) .................... 10-2008-0067290

(51) Int. Cl.
*H04W 4/00* (2009.01)
*H04W 72/00* (2009.01)
*H04B 7/00* (2006.01)

(52) U.S. Cl. ............... 370/328; 455/452.2; 455/522
(58) Field of Classification Search ........... 455/452.2, 455/522; 370/328
See application file for complete search history.

(56) References Cited

U.S. PATENT DOCUMENTS

| 2007/0091998 A1 | 4/2007 | Woo et al. |
| 2008/0159208 A1* | 7/2008 | Kloker et al. ............ 370/329 |
| 2009/0074007 A1* | 3/2009 | Yonge et al. ............ 370/468 |

FOREIGN PATENT DOCUMENTS
KR 10-2007-0051675 A 5/2007
* cited by examiner

*Primary Examiner* — Ronald Abelson
(74) *Attorney, Agent, or Firm* — Jefferson IP Law, LLP

(57) ABSTRACT

A frame structure, a method, and an apparatus for inter-frame resource sharing in a Cognitive Ratio (CR) communication system are provided. An apparatus for sharing a channel in an environment where a plurality of CR communication systems coexist, constitutes a Superframe Control Header (SCH), in one superframe, that includes a frame allocation MAP for frame information allocated to a Base Station (BS), with respect to each BS, and transmits and receives the SCH at the start frame of the frames allocated to the BSs.

28 Claims, 7 Drawing Sheets

METHOD AND APPARATUS FOR FRAME BASED RESOURCE SHARING IN COGNITIVE RADIO COMMUNICATION SYSTEM

PRIORITY

This application claims the benefit under 35 U.S.C. §119(a) of a Korean patent application filed in the Korean Intellectual Property Office on Jul. 10, 2008 and assigned Serial No. 10-2008-0067290, the entire disclosure of which is hereby incorporated by reference.

BACKGROUND OF THE INVENTION

1. Field of the Invention

The present invention relates to a Cognitive Radio (CR) communication system. More particularly, the present invention relates to a superframe structure, a method and an apparatus for sharing resources between frames when one or more CR systems sharing one channel are overlapped.

2. Description of the Related Art

In an environment where various wireless communication systems are using different spectrums, the lack of available frequencies limits the support of a high-speed multimedia service by allocating a new frequency band. To address the lack of the available frequencies, a Cognitive Radio (CR) technique for raising the frequency utilization is being introduced.

The CR technique allows a Secondary User (SU) to share the band while a Primary User (PU) having the existing frequency license is not using the corresponding band. The CR technique should be able to protect the PUs and to guarantee quality of service of the SUs, which is hereafter referred to as self coexistence. To offer broadband wireless access services over tens of km 100 km, an Institute of Electrical and Electronics Engineers (IEEE) 802.22 Wireless Regional Area Network (WRAN) standardization for sharing the currently allocated TV band based on the CR is under way.

In the CR system having the self coexistence function, a Base Station (BS) scans at least one empty channel not used by the primary/licensed system and establishes the communication over the scanned channel.

When several CR systems are co-located, they need to exchange a Coexistence Beacon Protocol (CBP) packet to increase the spectrum utilization. Meanwhile, when two close CR systems operate the same channel or the neighboring channels, they need to arrange a quiet period for the primary system so as to enhance a channel sensing performance. In the quiet period, they abort the data transmission and scan the channels in use.

To facilitate the self coexistence function, the CR system usually adopts a superframe structure. For example, the IEEE 802.22 standard defines 16 frames in the time axis as one superframe. Herein, the start frame of the superframe is set to deliver a Superframe Control Header (SCH). The standard describes that the structure of the superframe is used in a manner that one CR system or one CR BS occupies all the resources of the superframe unit in one frequency channel. The SCH contains necessary information for the coexistence of not only Customer Premise Equipments (CPEs) in the cell but also the CR systems or the CR BSs.

When the CR system includes a plurality of BSs, the CR systems or the CR BSs have to send the SCH over the same channel because of the small number of the available channels. Since the SCH is transmitted at the start point of the superframe as stated above, when the CR BSs send the SCH at the same time, the transmitted SCHs are likely to collide with each other. That is, when the information for the CPE control and the coexistence of the CR systems (or the CR BSs) is transmitted in the conventional superframe structure, the signal collision between the neighboring CR systems or the neighboring CR BSs can occur.

When the limited channel resources are used, a method and an apparatus are desired for mitigating interference between the BSs, and utilizing and sharing the resources more efficiently. In addition, a superframe structure for the inter-frame information sharing, and a method and an apparatus for efficiently using the limited frequency resources are desired in the CR communication system.

SUMMARY OF THE INVENTION

An aspect of the present invention is to address at least the above-mentioned problems and/or disadvantages and to provide at least the advantages described below. Accordingly, an aspect of the present invention is to provide a superframe structure for sharing resources between frames at a plurality of Base Stations (BSs) in a Cognitive Radio (CR) wireless communication system.

Another aspect of the present invention is to provide a method and an apparatus for sharing resources between frames at a plurality of BSs in a CR wireless communication system.

Yet another aspect of the present invention is to provide a method and an apparatus for preventing collision of Superframe Control Headers (SCHs) in the inter-frame resource sharing in a CR wireless communication system.

In accordance with an aspect of the present invention, an operating method for at least two wireless cellular communication systems to transmit in a same frequency resource is provided. The method includes dividing the frequency resource into a plurality of frames in time, such that each of the at least two wireless cellular communication systems is adapted to transmit during a set of the plurality of frames according to a frame pattern negotiated for each of the at least two wireless cellular communication systems, and broadcasting, by each of the at least two wireless cellular communication systems, the negotiated frame pattern in at least one frame of the set of the plurality of frames negotiated for each of the at least two wireless cellular communication systems.

In accordance with an aspect of the present invention, a method by at least two wireless cellular communication systems for coexisting in a same frequency resource is provided. The method includes dividing the frequency resource into a plurality of frames in time, such that each of the at least two wireless cellular communication systems is adapted to transmit during a set of the plurality of frames according to a frame pattern negotiated for each of the at least two wireless cellular communication systems, and broadcasting, by each of the at least two wireless cellular communication systems, control information including the negotiated frame pattern in at least one frame of the set of the plurality of frames negotiated for each of the at least two wireless cellular communication systems.

In accordance with another aspect of the present invention, a method by at least two base stations for coexisting on a same frequency resource is provided. The method includes dividing the frequency resource into a plurality of frames in time, such that each of the at least two base stations is adapted to transmit during a set of the plurality of frames according to a frame pattern negotiated for each of the at least two base stations, and transmitting, by each of the at least two base stations, control information including the negotiated frame pattern in at least one frame of the set of the plurality of frames negotiated for each of the at least two base stations.

In accordance with yet another aspect of the present invention, an apparatus of a CPE for inter-frame resource sharing in an environment where a plurality of CR communication systems coexist is provided. The apparatus includes a frame processor for receiving a superframe control information, a frame manager for, after receiving the superframe control information, determining whether a coexistence mode using a frame unit is indicated, and a controller for, in the coexistence mode is indicated, detecting an allocated at least one frame within a superframe.

In accordance with still another aspect of the present invention, an apparatus of a Base Station (BS) for coexisting in a same frequency resource in an environment where at least two wireless cellular communication systems coexist is provided. The apparatus includes a frame manager for dividing the frequency resource into a plurality of frames in time, such that each of the at least two wireless cellular communication systems is adapted to transmit during a set of the plurality of frames according to a frame pattern negotiated for each of the at least two wireless cellular communication systems, and a transmitter for broadcasting, control information including the negotiated frame pattern in at least one frame of the set of the plurality of frames negotiated for each of the at least two wireless cellular communication systems. In accordance with a further aspect of the present invention, an apparatus of a Base Station (BS) for coexisting in a same frequency resource in an environment where at least two wireless cellular communication systems coexist is provided. The apparatus includes a frame manager for dividing the frequency resource into a plurality of frames in time, such that each of the at least two base stations is adapted to transmit during a set of the plurality of frames according to a frame pattern negotiated for each of the at least two base stations, and a transmitter for transmitting control information including the negotiated frame pattern in at least one frame of the set of the plurality of frames negotiated for each of the at least two base stations.

In accordance with a further aspect of the present invention, an apparatus of a Customer Premise Equipment (CPE) for operating in an environment where a plurality of Cognitive Radio (CR) communication systems coexist is provided. The apparatus includes a frame processor for receiving a superframe control information, a frame manager for, after receiving the superframe control information, determining whether a coexistence mode using a frame unit is indicated, and a controller for, if the coexistence mode is indicated, detecting an allocated at least one frame within a superframe.

In accordance with a further aspect of the present invention, an apparatus for sharing a channel in an environment where a plurality of CR communication systems coexist is provided. The apparatus includes a frame offset that indicates a start frame in one superframe, among a plurality of allocated frames, wherein the apparatus constitutes an SCH, in one superframe, comprising a frame allocation MAP for frame information allocated to the BS, with respect to each BS, and transmits and receives the SCH at the start frame of the allocated frames.

In accordance with a further aspect of the present invention, an operating method of a BS for inter-frame resource sharing in an environment where a plurality of CR communication systems coexist is provided. The method includes scanning for an available channel, when there is no available channel, determining an occupation state of frames constituting a superframe with respect to a channel occupied by another CR communication system, determining an available frame in the superframe by taking into account the frame occupation state, and transmitting an SCH which comprises information of at least one available frame determined, over a corresponding frame of the superframe.

In accordance with a further aspect of the present invention, an operating method of a CPE for inter-frame resource sharing in an environment where a plurality of CR communication systems coexist is provided. The method includes determining one of a coexistence mode and a normal mode, and in the coexistence mode, extracting frame allocation information from a corresponding frame within a superframe and determining at least one frame that is allocated in the superframe.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a frame structure, a method, and an apparatus for the frame based resource sharing in a Cognitive Radio (CR) communication system.

Figure 1:
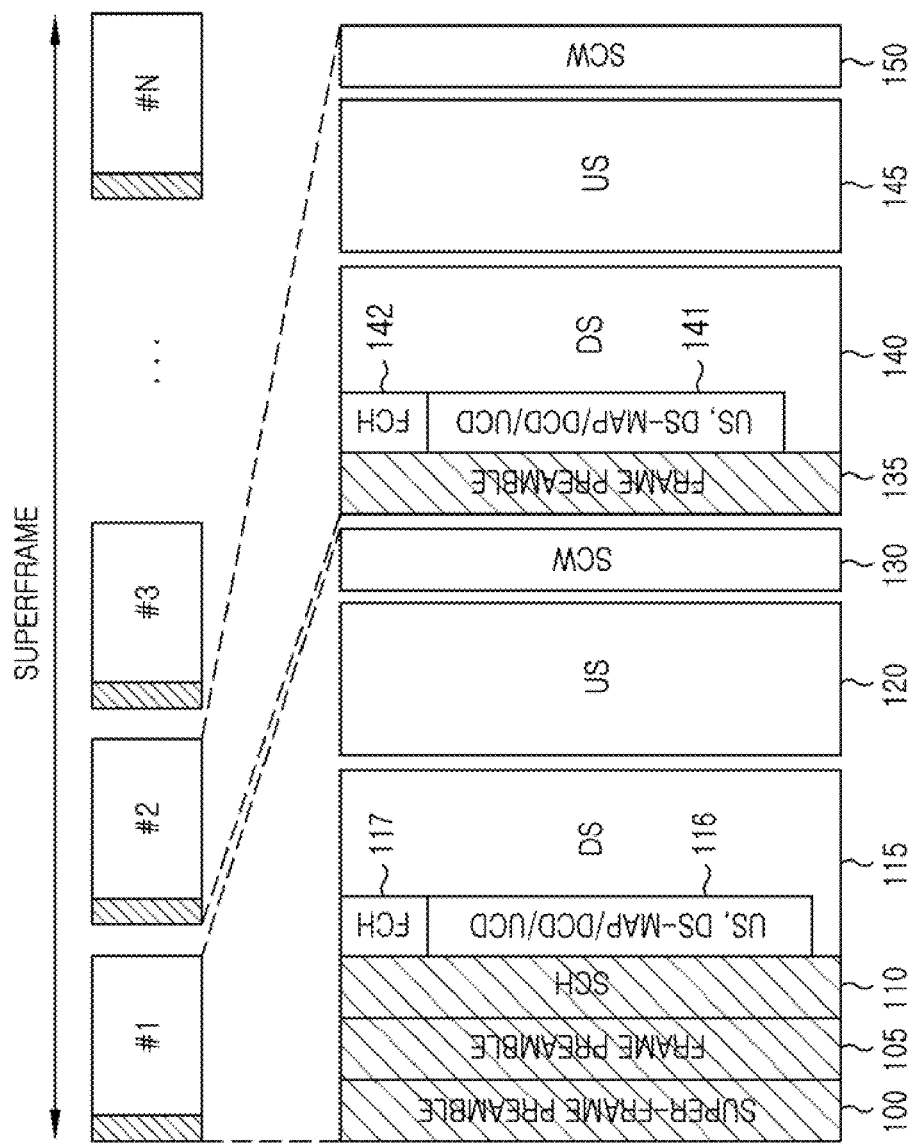
FIG. 1 illustrates a diagram of a superframe structure used in a Cognitive Radio (CR) system according to an exemplary embodiment of the present invention.

FIG. 1 illustrates a superframe structure used in a CR system according to an exemplary embodiment of the present invention.

Referring to FIG. 1, 16 frames constitute one superframe. The first frame #1 of the superframe includes a superframe preamble 100, a frame preamble 105, a Superframe Control Header (SCH) 110, DownStream (DS) 115, UpStream (US) 120, and a Self Coexistence Window (SCW) 130. The DS 115 includes a US-MAP/DS-MAP/DCD/UCD 116 and a Frame Control Header (FCH) 117.

The second frame includes a frame preamble 135, DS 140, US 145, and an SCW 150. Likewise, the third frame through the N-th frame (the 16th frame) are constituted substantially the same as the second frame. The DS 140 includes a US-MAP/DS-MAP/DCD/UCD 141 and an FCH 142.

The superframe preamble 100 is inserted only into the first frame #1, and not into the other frames (the second frame through the N-th frame). That is, one superframe includes only one superframe preamble 100.

As such, the first frame of each superframe carries the superframe preamble 100, the frame preamble 105, and the SCH 110. The SCH 110 carries not only a quiet period scheduling algorithm but also basic system information about cells in the system.

At the end of the superframe (the N-th frame), a Base Station (BS) controls to exchange Coexistence Beacon Protocol (CBP) packets between neighboring cells by scheduling the SCW intervals 130 and 150. Using the CBP packet exchange, several spectrum coexistence protocols/algorithms are carried out. Hence, by virtue of the spectrum coexistence mechanism, the neighboring cells may share the spectrum.

Figure 2:
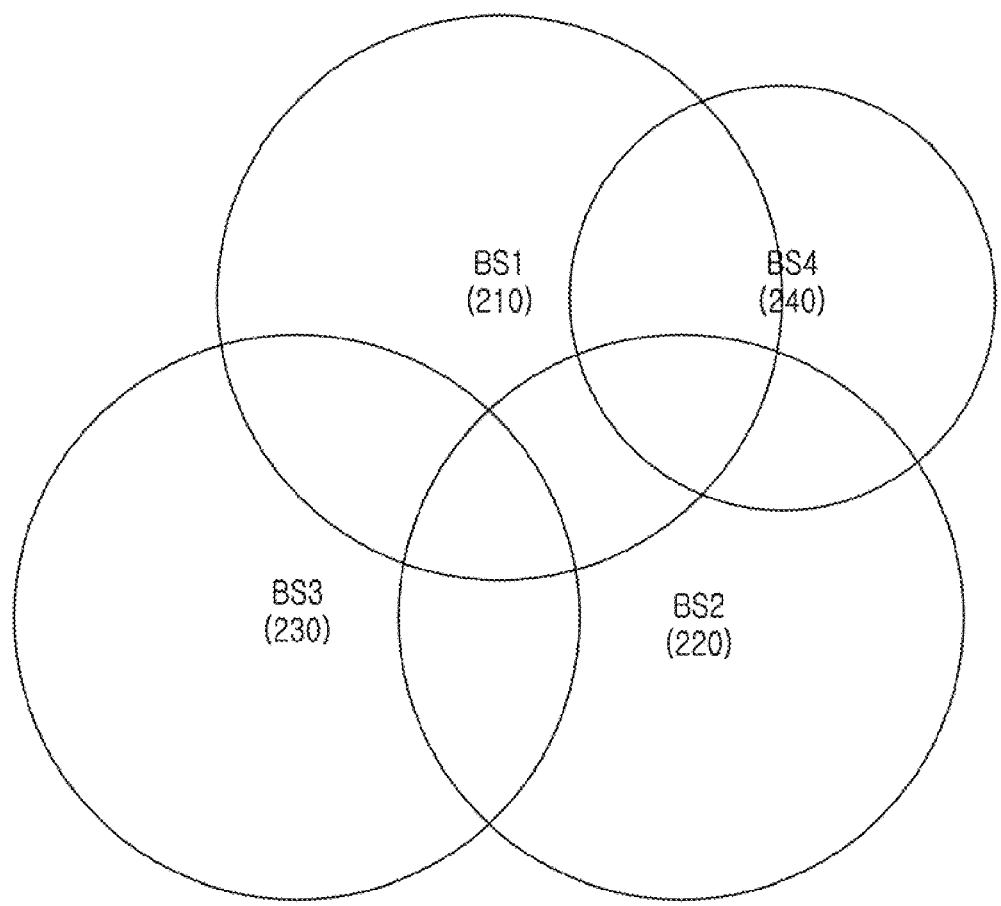
FIG. 2 illustrates a diagram of inter-frame sharing in a CR communication system according to an exemplary embodiment of the present invention.

FIG. 2 illustrates an inter-frame sharing according to an exemplary embodiment of the present invention. It is assumed that the CR systems positioned close to each other communicate using only one available channel as illustrated in FIG. 2, or the available channels are smaller than the coexistent CR systems in number and the channels to use are insufficient. The conventional method lets one CR System (or one CR BS) use one frequency channel on the superframe basis. Accordingly, when the multiple CR systems are close to each other, a new sharing mechanism is required to support the spectrum sharing with a finer resolution. In this regard, an exemplary embodiment of the present invention defines the spectrum sharing in the minimum frame unit. That is, an exemplary embodiment of the present invention provides the method and the apparatus for enabling the BSs to share one channel on a per frame basis in the superframe.

Referring to FIG. 2, a first cell 210, a second cell 220, and a third cell 230 are overlapping with each other, whereas a fourth cell 240 overlaps with the first cell 210 and the second cell 220 but does not overlap with the third cell 230.

It is assumed that the four cells 210 through 240 may perform data transmission according to a transmission scheduling scheme through negotiations. The negotiation is carried out by exchanging the CBP packets in the SCW. Herein, specific protocols and algorithms through which the coexistent cells acquire the scheduling are out of the scope of the present disclosure and will be omitted for conciseness in explanation.

According to the scheduling result, the first cell 210 transmits data over the frames 1, 4, 7, 10 and 13, the second cell 220 transmits data over the frames 2, 5, 8, 11 and 14, and the third cell 230 and the fourth cell 240 transmit data over the frames 3, 6, 9, 12, 15 and 16. In the CR communication system which shares and uses one channel, the scheduling is performed to prevent the overlapping cells 210 and 220 and 230 from transmitting the data at the same time. In contrast, even when the third cell 230 and the fourth cell 240, which do not overlap with each other, transmit the data at the same time, interference does not occur due to the distance between them. Thus, the third cell 230 and the fourth cell 240 can concurrently transmit data.

The first cell 210 transmits the superframe preamble and the SCH information in the first allocated frame interval. The second cell 220 transmits the superframe preamble and the SCH information in the second allocated frame interval. The third cell 230 and the fourth cell 240 transmit the superframe preamble and the SCH information in the third allocated frame interval.

To allow the inter-frame coexistence mode, the conventional superframe structure and the conventional SCH format need to be modified.

Figure 3:
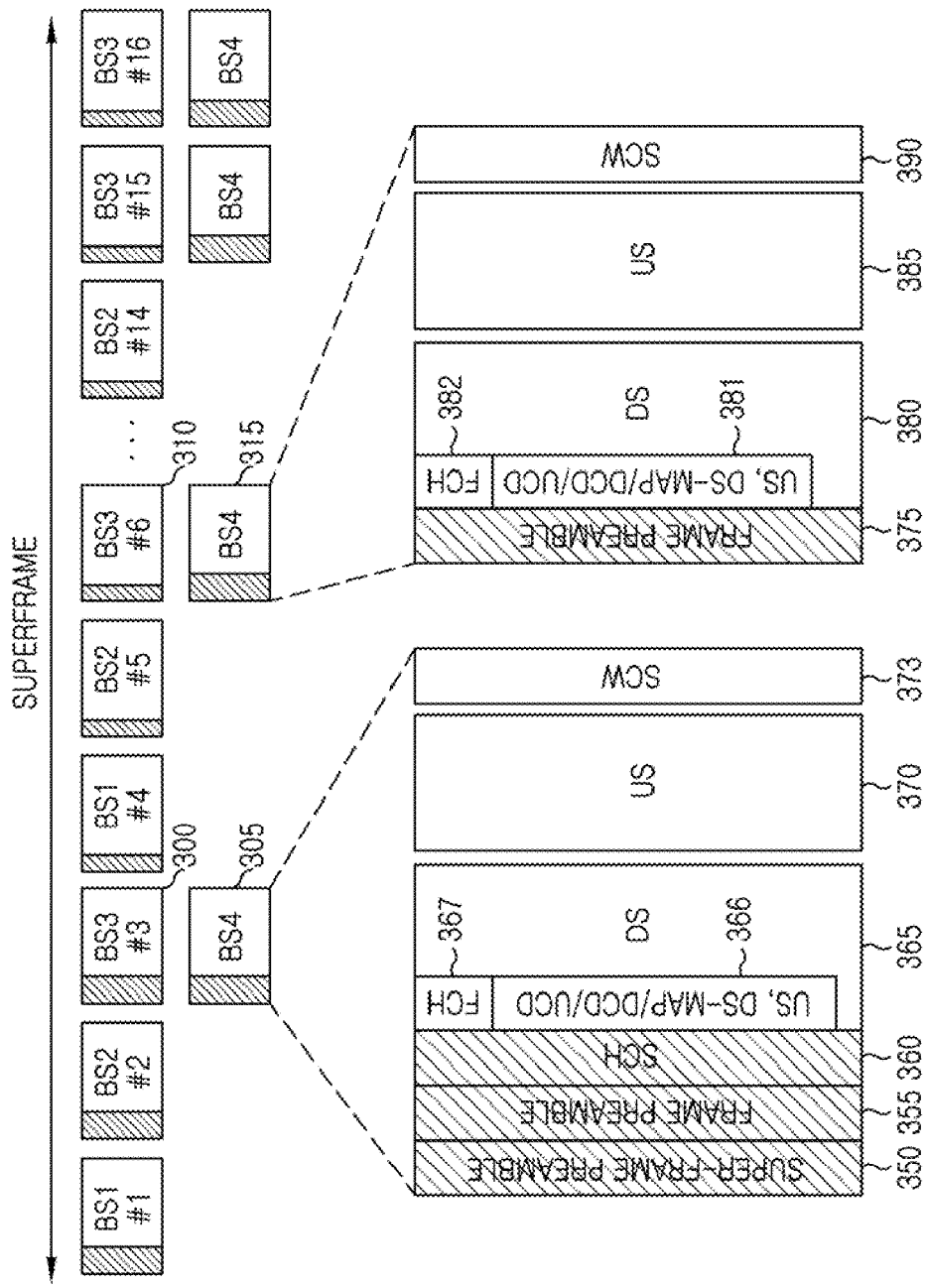
FIG. 3 illustrates a diagram of a superframe structure according to an exemplary embodiment of the present invention.

FIG. 3 illustrates a superframe structure according to an exemplary embodiment of the present invention.

Referring to FIG. 3, for the first cell 210 through the fourth cell 240 to share the resources on a frame basis, the superframe preamble and the SCH are added to the frame initiated by the first cell 210 through the fourth cell 240 in one superframe structure. For example, when the frames 1, 4, 7, 10 and 13 are allocated to the first cell 210, the frames 2, 5, 8, 11 and 14 are allocated to the second cell 220, and the frames 3, 6, 9, 12, 15 and 16 are allocated to the third cell 230 and the fourth cell 240 within one superframe, the start frame of the first cell 210 is the first frame, the start frame of the second cell 220 is the second frame, and the start frame of the third cell 230 and the fourth cell 240 is the third frame. The first frame, the second frame, and the third frame each include the corresponding superframe preamble and the corresponding SCH information. That is, the first, second and third frames include a superframe preamble 350, a frame preamble 355, an SCH 360, DS 365, and US 370. The DS 365 includes US, DS-MAP/DCD/UCD 366, and an FCH 367. At the end of the frame, an SCW interval 373 is defined.

The other frames of the superframe (the frames excluding the first, second, and third frames) include a frame preamble 375, DS 380, and US 385. The DS 385 includes US, DS-MAP/DCD/UCD 381, and an FCH 382. At the end of the frame, an SCW interval 390 is defined.

The third frame includes the frames 300, 310, 305 and 315 allocated to the third cell 230 and the fourth cell 240 at the same time, and the third cell 230 and the fourth 240 do not overlap with each other. Hence, interference does not occur even when the third frame is concurrently shared in the same channel.

In the superframe of FIG. 3, the frames are allocated to the BS1, the BS2, and the BS3 and their start frames (e.g., the start frame of the BS1 is the frame 1, the start frame of the BS2 is the frame 2, and the start frame of the BS3 is the frame 3) each include the SCH. In various implementations, the SCH may be contained in another frame than the start frame of the frames allocated to the BSs in the superframe.

Table 1 shows a new SCH format according to an exemplary embodiment of the present invention.

TABLE 1

| Syntax | Notes |
| --- | --- |
| Superframe_Control_Header_Format( ) { | |
| SCH_Type | Indicates the operation mode of a current cell<br>Normal mode = 0<br>Coexistence mode = 1 |
| If SCH_Type=1 { | |
| Frame Allocation Map | Indicates which frames in the present super-frame are assigned to a present WRAN cell |
| } | |
| CT | Content Type<br>Indicates the type of the content following the transmission of the SCH.<br>Superframe = 0<br>CBP Beacon = 1 |
| Superframe Number | Positive integer that represents the superframe number (modulo 255). |
| TxID | MAC address that uniquely identifies the CPE or BS transmitting the SCH. |
| CN | Indicates the physical TV channel number used by the BS. |
| CP | Cyclic Prefix Factor: Specifies the size of the cyclic prefix in this superframe. |
| Quiet period information | Quiet period scheduling information. |
| Other IEs | Other information to be broadcast |

The SCH information includes SCH Type, Frame Allocation Map, Superframe Number, TxID, CN, CP, Quiet period information, and other information to be broadcast.

The SCH Type indicates an operation mode of the current cell. For example, the SCH Type '0' indicates a normal mode and the SCH Type '1' indicates a coexistence mode based on the frame. In the normal mode, one CR system (or one CR BS) regularly transmits the SCH information in the first frame interval of the superframe as described with reference to FIG. 1. In addition, one CR system (or one CR BS) occupies the resources on a superframe basis in the normal mode. In the frame based coexistence mode, a plurality of CR systems (or CR BSs) can share the frame based resources as described with reference to FIG. 3.

In the frame based coexistence mode, the Frame Allocation Map indicates which frames in the superframe are allocated to the current cell (or BS). For example, in FIG. 3, the Frame Allocation Map of the first cell 210 indicates that the frames 1, 4, 7, 10 and 13 are allocated to the first cell 210, the Frame Allocation Map of the second cell 220 indicates the frames 2, 5, 8, 11 and 14 are allocated to the second cell 220, and the Frame Allocation Map of the third cell 230 and the fourth cell 240 indicates that the frames 3, 6, 9, 12, 15 and 16 are allocated to the third cell 230 and the fourth cell 240.

The Content Type (CT) indicates a type of the content following the SCH transmission. For example, CT '0' indicates the superframe and CT '1' indicates the CBP packet. The Superframe Number is a positive integer representing the superframe, the TxID is a Media Access Control (MAC) address for identifying the BS or the CPEs, the CN indicates the number of physical TV channels used by the BS, the Cyclic Prefix (CP) indicates a size of the CP in the superframe, and the Quiet period information is quiet period scheduling information.

As such, from the new SCH information, the CPEs within the cell (or the BS) can acquire the start point of the superframe and the available resources (frame or frames). More specifically, the CPE in a certain cell (or BS) can acquire the start point of the superframe based on the Frame Offset information and distinguish the serviced resources (frame or frames) in its cell.

Figure 4A:
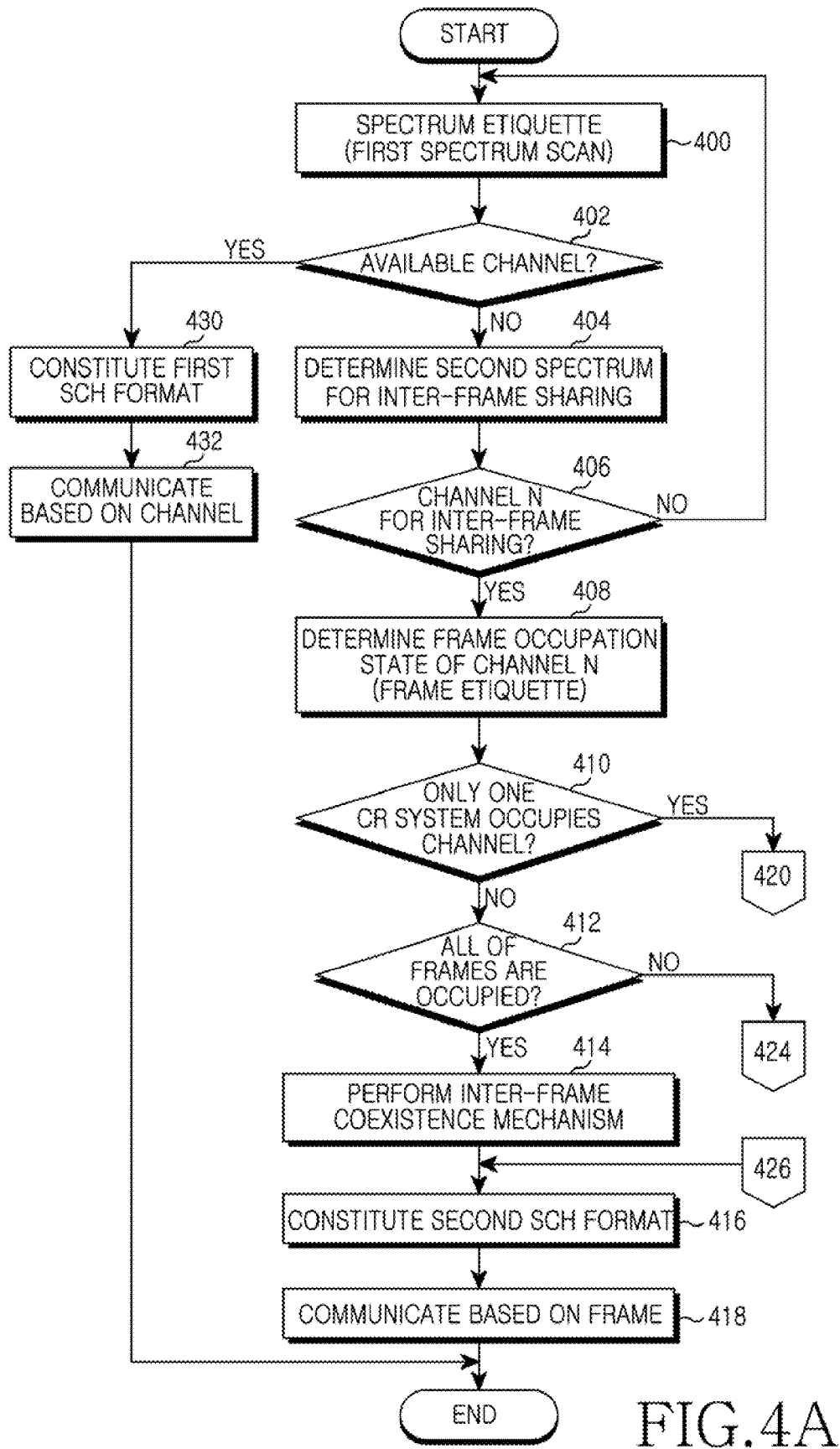
FIGS. 4A and 4B illustrate a flowchart of operations of a Base Station (BS) for an inter-frame sharing in a CR communication system according to an exemplary embodiment of the present invention.
Figure 4B:
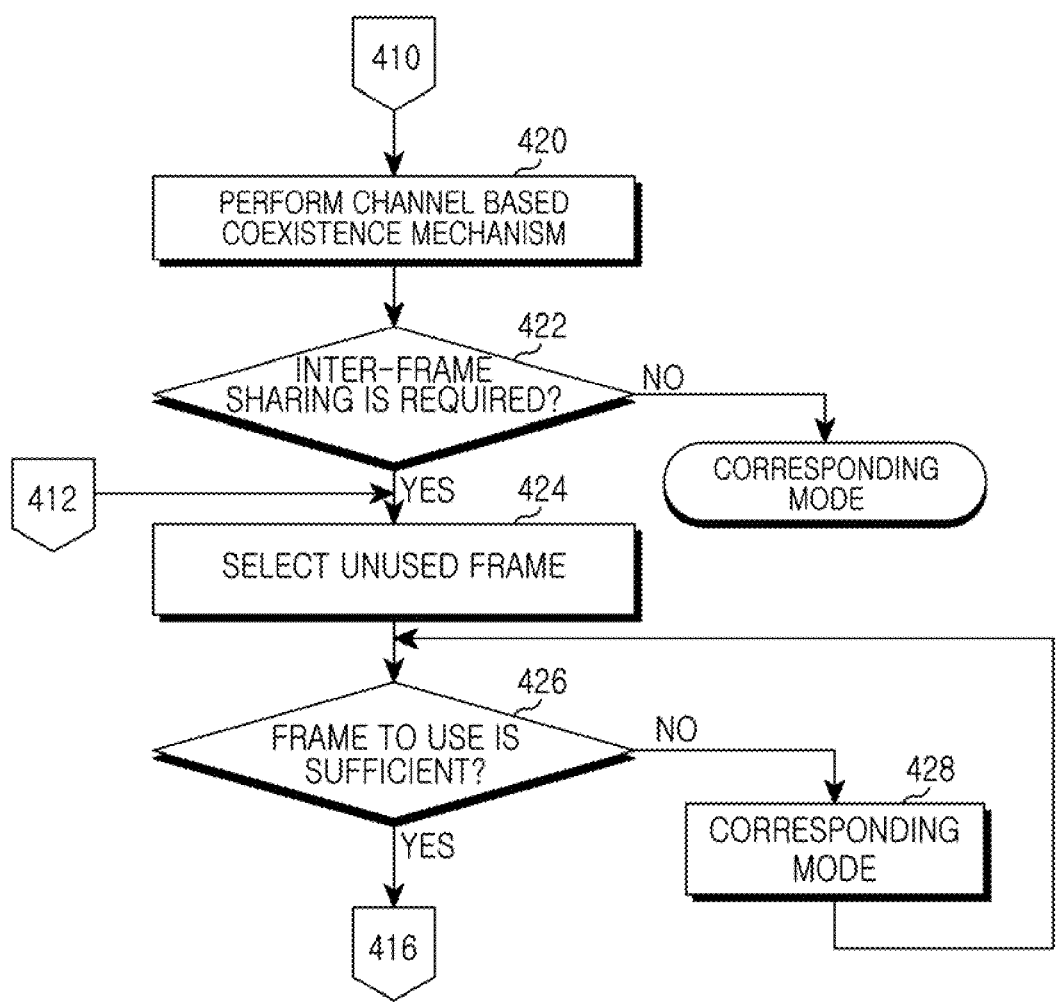

FIGS. 4A and 4B illustrate a flowchart outlining operations of a BS for an inter-frame sharing in a CR communication system according to an exemplary embodiment of the present invention.

In step 400, the BS performs a first spectrum etiquette (i.e. first spectrum scan). Through the first spectrum etiquette, the BS selects a channel which does not interfere with other primary systems and other CR communication systems.

In step 402, the BS determines whether there exists an available channel that does not interfere with the primary systems and the other CR communication systems. Upon detecting the available channel, the BS constitutes the conventional SCH format in step 430 (i.e., the BS constitutes the SCH information to occupy the whole superframe) and communicates based on the superframe (e.g. the superframe structure illustrated in FIG. 1) including the constituted SCH format in step 432. For example, the BS indicates the normal mode by setting the SCH Type of the SCH information to '0' in Table 1. Next, the BS sustains the normal mode operation until the channel switching from the selected available channel to another channel is needed. At that time, the BS re-scans the available channel.

Returning to step 402, when it is determined that there is no available channel in step 402, the BS determines a channel that is sharable between the frames among the channels used by the other CR communication systems in step 404 (assuming that a channel N allows the inter-frame resource sharing). That is, the BS determines whether a certain channel N used by the other CR communication system may be shared between the frames, by listening to the superframe preamble and the SCH of the other coexistent CR communication system.

When the channel for the inter-frame sharing is detected in step 406, the BS proceeds to step 408. When no channel for the inter-frame sharing is detected in step 406, the BS returns to step 400 and scans another channel.

In step 408, the BS determines the frame occupation state of the channel N by performing the frame etiquette. The frame etiquette scans the superframe and detects a signal from the coexistent CR communication system. When one or more frames are determined as a result of the scan as being "empty"; that is, when the frame is not occupied by the coexistent CR system or the coexistent CR systems occupying the frame are sufficiently far away, the empty frames are occupied.

When only one CR communication system exclusively occupies the channel N in step 410, the BS proceeds to step 420, which is discussed further below. When only one CR communication system does not exclusively occupy the channel N (when one or more CR communication systems occupy the channel N) in step 410, the BS determines whether all of the frames of the channel N are occupied in step 412. When all of the frames are occupied in step 412, the BS performs the inter-frame sharing mechanism in step 414. For example, the inter-frame sharing mechanism includes a frame renting/offer algorithm and a frame contention algorithm. When all of the frames are not occupied in step 412, the BS proceeds to step 424. In step 424, the BS selects at least one unused frame in the corresponding channel.

The frame renting/offering algorithm is initiated when all of the frames are occupied by the coexistent systems. The current BS selects at least one intended frame from the occupied frames, and sends a Resource Rent REQuest (RR-REQ) requesting the frame resources in the intended amount to a target coexistent system which occupies the corresponding frames by exchanging the CBP packets in the SCW interval. The target coexistent system occupying the corresponding frames responds with a Resource Allocation (RA)-ReSPonse (RSP) message to allocate its extra frames.

The frame renting/offering algorithm is performed on a token basis. That is, the current BS commands the amount of a token credit to seize a frame-based transmission. The target coexistent systems receive the RR-REQ message and respond to the BS with a RA-RSP message. After the frame renting/offering algorithm is successfully carried out, the BS and the other coexistent systems can share the frames within one superframe.

According to the frame contention algorithm, the BS sends Frame Contention (FC)-REQ to the other coexistent system already occupying the frames using the CBP packets of the SCW interval, and the other coexistent system determines the priority of the frame and sends a FC-REPly (REP). The FC-REQ message includes a frame index of the intended frame, a start point and an end point of the frame occupation, and a contention parameter with a random variable. Herein, the random variable determines the priority of the frame. For example, while the contention request is received, when the random variable of the other coexistent systems is greater than the random variable carried by the FC-REQ message, the channel contention fails. By contrast, when the random variable of the other coexistent systems is smaller than the random variable carried by the FC-REQ message, the channel contention is successful.

Herein, the coexistent systems can also adopt a mechanism that is a combination of several algorithms (e.g. the frame renting/offering algorithm and the frame contention algorithm). For example, the BS performs the frame etiquette to scan the empty frame in step 408. When there is no empty frame, the BS performs the frame renting/offering algorithm and the frame contention algorithm in step 414. When sufficient frame resources are not acquired, even through the frame renting/offering algorithm, the BS executes the frame contention algorithm to acquire sufficient frame resources.

Next, the BS constitutes a second SCH format in step 416 (i.e., the BS constitutes the SCH format such that the multiple BSs coexist within one superframe as illustrated in FIG. 3). For example, when the BS has no available channel and can achieve the inter-frame sharing by selecting a sharable channel of the frame resources among the channels used by the other CR systems, the SCH Type value is set to '1'. In addition, the unoccupied frames, or the frame information allocated through the inter-frame coexistence mechanism is informed using the Frame Allocation Map of the SCH.

In step 418, the BS communicates on a frame basis by transmitting the superframe including the SCH.

In contrast, when only one CR communication system exclusively occupies the channel N in step 410, the BS performs a channel-based coexistence mechanism, that includes several algorithms, to scan the channel-based resource sharing in step 420. For example, the channel-based coexistence mechanism may include a channel renting/offering algorithm and a channel contention algorithm. The channel renting/offering algorithm and the channel contention algorithm are similar to the frame renting/offering algorithm and the frame contention algorithm.

In step 422, the BS determines whether inter-frame resource sharing is required after the channel-based coexistence mechanism. When the inter-frame resource sharing is required, the BS selects at least one unused frame in the corresponding channel in step 424. When the inter-frame resource sharing is not needed, the BS proceeds to a corresponding mode. For example, the BS can sustain the channel-based resource sharing mechanism in the corresponding mode.

In step 426, the BS determines whether the frame to use is sufficient. When the frame is sufficient, the BS proceeds to step 416 and then to step 418. When the frame is not sufficient, the BS proceeds to a corresponding mode in step 428, and then returns to step 426.

After step 418, the BS finishes this process.

As such, when all of the frames are occupied by the primary CR system, or when more frame resources are required after the BS establishes the communication using the available frames, the frame based coexistence mechanism is triggered to request the frame resources from the primary CR system.

When the frame based coexistence mechanism succeeds, the BS can acquire one or more frame resources. When the frame based coexistence mechanism is not successful, the BS cannot acquire one or more frame resources. In this case, the BS can migrate to another channel of the other coexistent CR system and repeat the steps 408 through 426 (not shown in FIGS. 4A and 4B).

Figure 5:
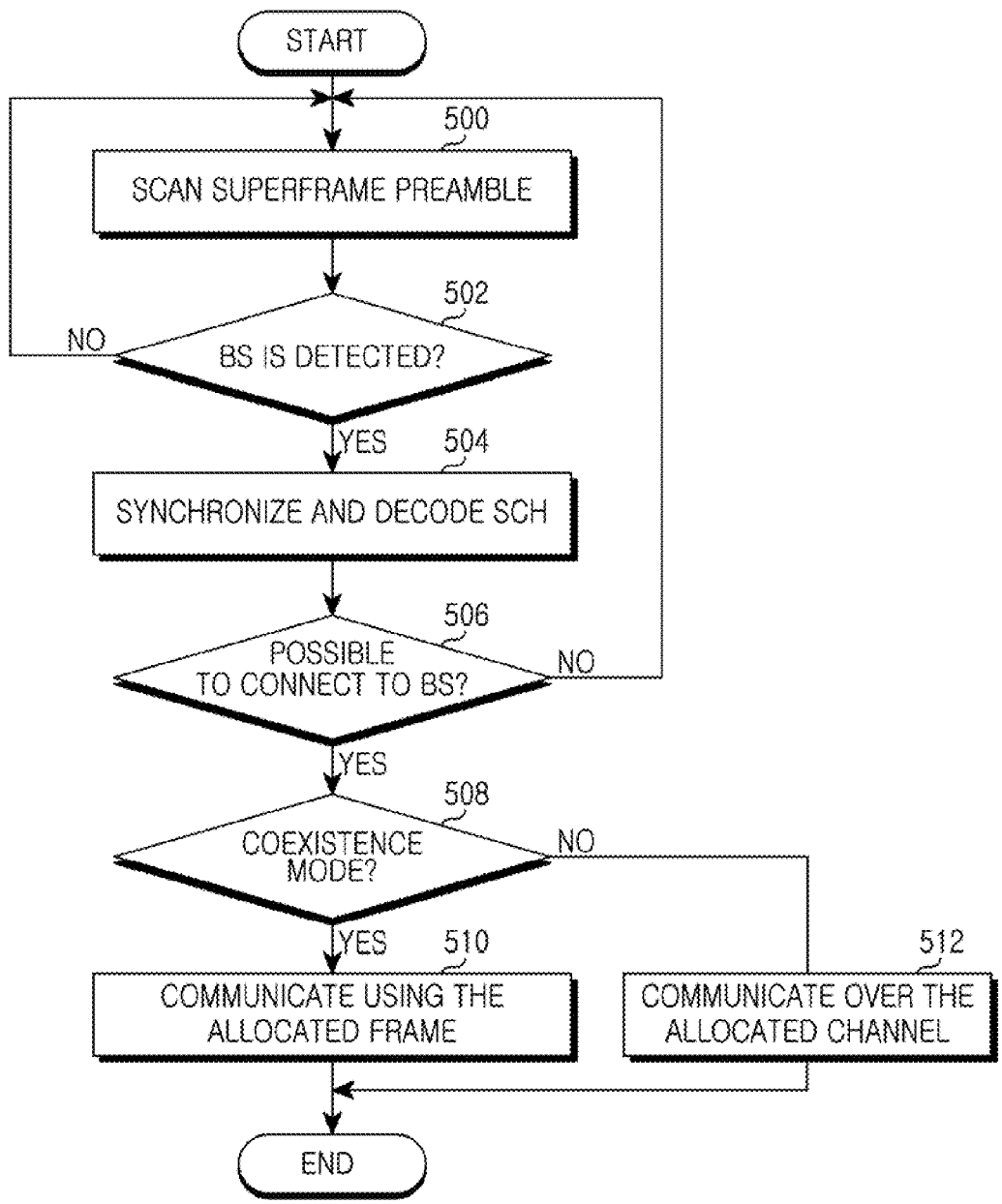
FIG. 5 illustrates a flowchart of operations of a Customer Premise Equipment (CPE) for an inter-frame sharing in a CR communication system according to an exemplary embodiment of the present invention.

FIG. 5 illustrates a flowchart outlining operations of a CPE for an inter-frame sharing in a CR communication system according to an exemplary embodiment of the present invention.

Referring to FIG. 5, in step 500, the CPE scans the superframe preamble. By scanning the superframe preamble, the CPE searches for the operating BS through a conventional initial procedure. For example, in the superframe structure illustrated in FIG. 3, the CPE scans for its superframe preamble in the first frame of the first cell 210, the second frame of the second cell 220, and the third frame of the third cell 230 and the fourth cell 240.

In step 502, the CPE checks whether the corresponding BS is detected. When the corresponding BS is detected, the CPE proceeds to step 504. When the corresponding BS is not detected, the CPE returns to step 500 and scans its superframe.

In step 504, the CPE maintains the synchronization process with the detected BS using the frame preamble following the superframe preamble, decodes the SCH information, and identifies the type of the SCH and the operation mode of the current cell. When the SCH indicates the normal mode, the CPE continues the conventional initial procedure and the network entry procedure.

In step 506, the CPE determines whether it can be connected to the BS. When the connection is possible, the CPE proceeds to step 508. When the connection is impossible, the CPE returns to step 500. Herein, the determining whether the CPE can be connected to the BS is carried out using the unique identifier (TxID) information of the CPE or the BS.

In step 508, the CPE determines whether it is in the coexistence mode based on the type information of the SCH. In the coexistence mode, the CPE continues the initial procedure and the network entry procedure over the allocated frame of the current BS in step 510. The allocated frame can be located by acquiring Frame Allocation Map information.

When the CPE is not in the coexistence mode, the CPE continues the initial procedure and the network entry procedure in the allocated channel of the current BS in step 512.

Next, the CPE finishes this process.

Figure 6:
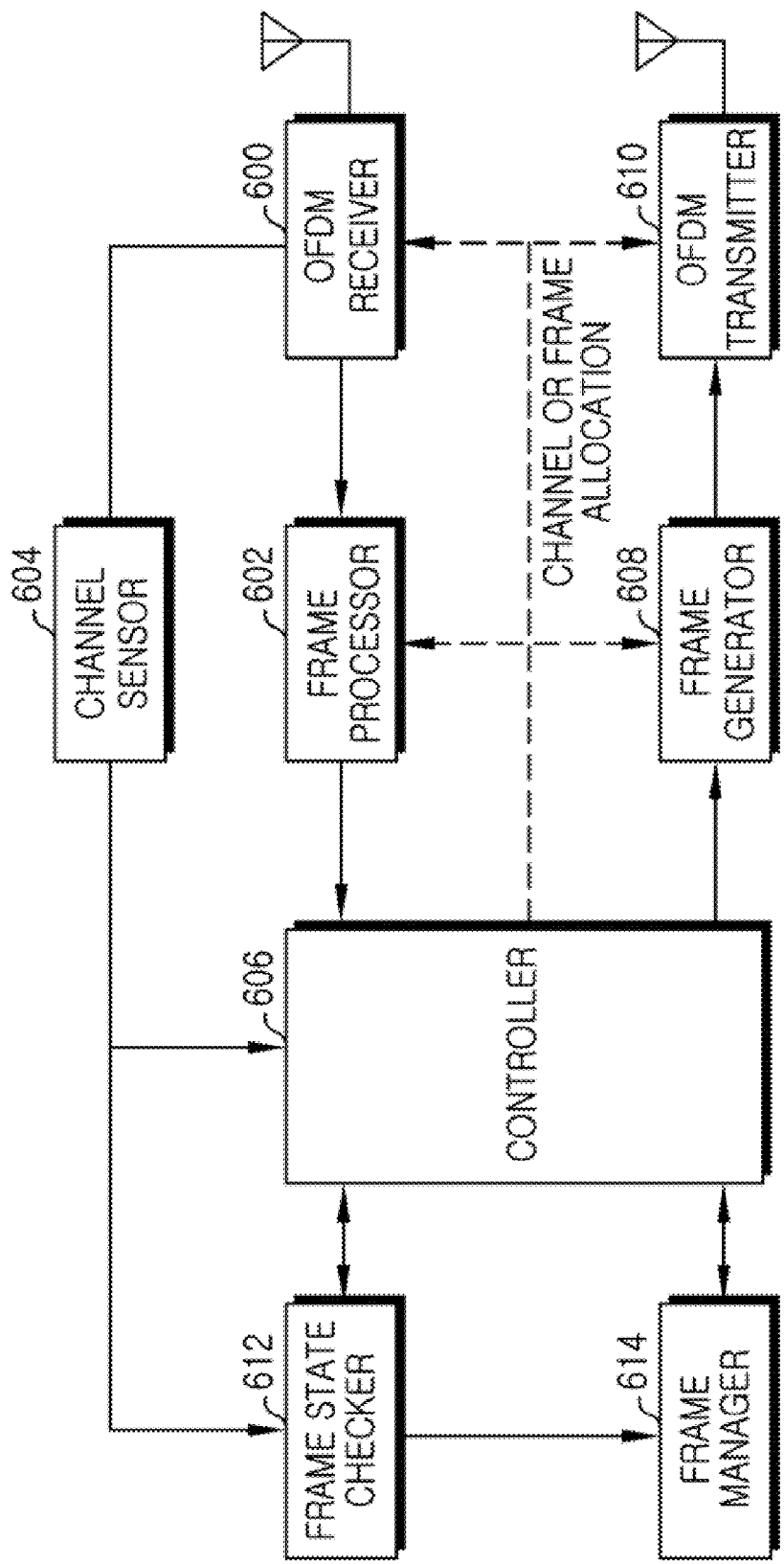
FIG. 6 is a block diagram of an apparatus for an inter-frame sharing in a CR communication system according to an exemplary embodiment of the present invention.

FIG. 6 illustrates a block diagram of an apparatus for an inter-frame sharing in a CR communication system according to an exemplary embodiment of the present invention. The apparatus can be the BS or the CPE. Since the structures of the BS and the CPE are similar, a block diagram corresponding to both the CPE and the BS is described below with reference to FIG. 6.

Referring to FIG. 6, the apparatus includes an Orthogonal Frequency Division Multiplexing (OFDM) receiver 600, a frame processor 602, a channel sensor 604, a controller 606, a frame generator 608, an OFDM transmitter 610, a frame state checker 612, and a frame manager 614.

The OFDM receiver 600 converts a Radio Frequency (RF) signal received from the BS or the CPE into a baseband signal, and converts the baseband analog signal into digital sample data. The OFDM receiver 600 OFDM-demodulates the sample data and outputs subcarrier values. Herein, the OFDM demodulation includes a Cyclic Prefix (CP) removal operation, a Fast Fourier Transform (FFT) operation, and so on.

The frame processor 602 decomposes a control message output from the OFDM receiver 600 and provides the result to the controller 606.

The controller 606 controls the BS or the CPE, correspondingly processes the information output from the frame processor 602, and provides the result of the processing to the frame generator 608.

The frame generator 608 generates a message with the various information output from the controller 606 and outputs the generated message to the OFDM transmitter 610 of the physical layer.

The OFDM transmitter 610 encodes and modulates the data output from the frame generator 608 at a preset modulation level (Modulation and Coding Scheme (MCS) level). Next, the OFDM transmitter 610 outputs sample data (OFDM symbols) by Inverse FFT (IFFT)-processing the modulated data. After converting the sample data into an analog signal, the OFDM transmitter 610 converts the analog signal into an RF signal and transmits the RF signal over an antenna.

In the BS operations, the frame state checker 612 determines whether the inter-frame resource sharing is required. For instance, the frame state checker 612 is informed of the scanning result, indicating the channels not used by the coexistent systems, from a channel sensor 604. When there is no available channel, the frame state checker 612 selects the channel for the inter-frame sharing from the channels being used by the coexistent systems, and examines the occupation state of the frame of the selected channel for the inter-frame sharing.

When only one coexistent system occupies the selected channel for the inter-frame sharing, the frame state checker 612 controls the controller 606 to share the channel using the channel based coexistence mechanism (the channel renting/offering algorithm or the channel contention algorithm). When one or more coexistent systems occupy the selected channel for the inter-frame sharing, the frame state checker 612 determines the frame occupation state.

When the necessary information is provided from the controller 606 and the inter-frame resource sharing is required, the frame generator 608 constitutes a superframe including the first SCH based on the frame. The first SCH information includes the start frame information (Frame Offset) of the corresponding CR communication system and the frame pattern information (Frame Allocation Map) allocated to the corresponding CR communication system (see Table 1).

When the inter-frame resource sharing is not needed, the frame generator 608 constitutes a second superframe on a channel basis.

When all of the frames of the selected channel for the inter-frame sharing are occupied, the frame manager 614 is allocated at least one frame through the inter-frame coexistence mechanism (the frame renting/offering algorithm and the frame contention algorithm). When all of the frames of the selected channel for the inter-frame sharing are not occupied, the frame manager 614 selects at least one of the unoccupied frames. Next, when the frames to use are not sufficient, the frame manager 614 is allocated one or more additional frames through the inter-frame coexistence mechanisms.

In the CPE operations, the frame processor 602 receives the corresponding superframe preamble. After receiving the corresponding superframe preamble, the frame manager 614 determines whether it is in the frame based coexistence mode. In the frame based coexistence mode, the controller 606 communicates by locating the allocated frame in the superframe. Herein, in the frame based coexistence mode, a plurality of CR systems uses the allocated frame within one superframe.

To locate the allocated frame in the superframe, the controller 606 utilizes the start frame information (Frame Offset) of the corresponding CR communication system and the frame pattern information (Frame Allocation Map) allocated to the corresponding CR communication system, and so on.

When not in the frame based coexistence mode, the controller 606 communicates over the allocated channel.

As set forth above, the novel superframe structure in the CR communication system allows for the inter-frame resource sharing. In addition, in the inter-frame resource sharing, SCH collision is addressed.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method by at least two wireless networks for coexisting on a same channel, the method comprising:
    generating a control header comprising a mode information and a frame allocation information; and
    broadcasting, by each of the at least two wireless networks, the control header at a first frame of frames allocated to each of the at least two wireless networks,
    wherein the at least two wireless network share a channel on a per frame basis in a superframe,
    wherein the mode information indicates either a coexistence mode or a normal mode for a current cell that is operated by the wireless network broadcasting the control header, and
    wherein the frame allocation information indicates which frames are allocated to the current cell.

2. The method of claim 1, wherein the control header includes at least one of a superframe number, quiet period information, an identifier of a current base station that is included in the wireless network and broadcasts the control header, a channel number indicates physical TV channel number used by the current base station, and a cyclic prefix factor specifying a size of a cyclic prefix in the set of the plurality of frames negotiated.

3. The method of claim 1, further comprising:
    determining the set of the plurality of frames for each of the at least two wireless networks, wherein the determining of the set of the plurality of frames comprises:
scanning for a channel not used by at least one coexistent system;
when there is no available channel, selecting a channel for the inter-frame sharing from channels used by the at least one coexistent system; and
determining a frame occupation state of the selected channel for the inter-frame sharing.

4. The method of claim 3, wherein, when only one coexistent system occupies the selected channel for the inter-frame sharing, the channel is shared using a channel based coexistence mechanism which comprises a channel renting/offering algorithm and a channel contention algorithm, and
when one or more coexistent systems occupy the selected channel for the inter-frame sharing, the frame occupation state is determined.

5. The method of claim 3, wherein, when all of frames of the selected channel for the inter-frame sharing are occupied, one or more frames are allocated by performing an inter-frame coexistence mechanism which comprises a frame renting/offering algorithm and a frame contention algorithm.

6. A method by at least two base stations for coexisting on a same channel, the method comprising:
generating a control header comprising a mode information and a frame allocation information; and
transmitting, by each of the at least two base stations, the control header at a first frame of frames allocated to each of the at least two base stations,
wherein the at least two base stations share a channel on a per frame basis in a superframe,
wherein the mode information indicates either a coexistence mode or a normal mode for a current base station broadcasting the control header, and
wherein the frame allocation information indicates which frames are allocated to the current base station.

7. The method of claim 6, wherein the control header includes at least one of a superframe number, quiet period information, an identifier of a current base station broadcasting the control header, a channel number indicates physical TV channel number used by the current base station, and a cyclic prefix factor specifying a size of a cyclic prefix in the set of the plurality of frames negotiated.

8. A method by a Customer Premise Equipment (CPE) for operating in an environment where a plurality of Cognitive Radio (CR) wireless networks coexist, the method comprising:
receiving a control header comprising a mode information and a frame allocation information;
determining whether a coexistence mode is indicated based on the mode information; and
if the coexistence mode is indicated, determining at least one frame allocated to a wireless network transmitting the control header based on the frame allocation information,
wherein the wireless network shares a channel on a per frame basis in a superframe,
wherein the mode information indicates either a coexistence mode or a normal mode for a current cell broadcasting the control header, and
wherein the frame allocation information indicates which frames are allocated to the current cell.

9. The method of claim 8, wherein the control header further includes at least one of a superframe number, quiet period information, an identifier of a current base station that is included in a CR wireless network and transmits the control header, a channel number indicates physical TV channel number used by the current base station, and a cyclic prefix factor specifying a size of a cyclic prefix in the superframe.

10. An apparatus of a Base Station (BS) for coexisting in a same channel in an environment where at least two wireless networks coexist, the apparatus comprising:
a generator for generating a control header comprising a mode information and a frame allocation information; and
a transmitter for broadcasting the control header at a first frame of frames allocated to each of the at least two wireless networks,
wherein the at least two wireless networks share a channel on a per frame basis in a superframe,
wherein the mode information indicates either a coexistence mode or a normal mode for a current cell that is operated by the wireless network broadcasting the control header, and
wherein the frame allocation information indicates which frames are allocated to the current cell.

11. The apparatus of claim 10, wherein the control header further includes at least one of a superframe number, quiet period information, an identifier of a current base station that is included in the wireless network and broadcasts the control header, a channel number indicates physical TV channel number used by the current base station, and a cyclic prefix factor specifying a size of a cyclic prefix in the set of the plurality of frames negotiated.

12. The apparatus of claim 10, further comprising:
a controller for determining the set of the plurality of frames for each of the at least two wireless networks,
wherein the controller scans a channel not used by at least one coexistent system, when there is no available channel, selects a channel for the inter-frame sharing from channels used by the at least one coexistent system and determines a frame occupation state of the selected channel for the inter-frame sharing.

13. The apparatus of claim 12, wherein, when only one coexistent system occupies the selected channel for the inter-frame sharing, the channel is shared using a channel based coexistence mechanism which comprises a channel renting/offering algorithm and a channel contention algorithm, and when one or more coexistent systems occupy the selected channel for the inter-frame sharing, the frame occupation state is determined.

14. The apparatus of claim 12, wherein, when all of frames of the selected channel for the inter-frame sharing are occupied, one or more frames are allocated by performing an inter-frame coexistence mechanism which comprises a frame renting/offering algorithm and a frame contention algorithm.

15. An apparatus of a Base Station (BS) for coexisting in a same channel in an environment where at least two wireless networks coexist, the apparatus comprising:
a generator for generating a control header comprising a mode information and a frame allocation information; and
a transmitter for transmitting control information the control header at a first frame of frames allocated to the BS,
wherein the at least two wireless networks share a channel on a per frame basis in a superframe,
wherein the mode information indicates either a coexistence mode or a normal mode for a current base station broadcasting the control header, and
wherein the frame allocation information indicates which frames are allocated to the current base station.

16. The apparatus of claim 15, wherein the control header includes at least one of a superframe number, quiet period information, an identifier of a current base station broadcasting the control header, a channel number indicates physical TV channel number used by the current base station, and a cyclic prefix factor specifying a size of a cyclic prefix in the set of the plurality of frames negotiated.

17. The apparatus of claim 15, wherein the control header includes a mode information and a frame allocation information,
wherein the mode information indicates either a coexistence mode or a normal mode for a current base station broadcasting the control header, and the frame allocation information indicates which frames are allocated to the current base station.

18. An apparatus of a Customer Premise Equipment (CPE) for operating in an environment where a plurality of Cognitive Radio (CR) wireless networks coexist, the apparatus comprising:
a frame processor for receiving a control header comprising a mode information and a frame allocation information based on the mode information;
a frame manager for determining whether a coexistence mode is indicated; and
a controller for, if the coexistence mode is indicated, determining at least one frame allocated to a wireless network transmitting the control header based on the frame allocation information,
wherein the wireless network shares a channel on a per frame basis in a superframe,
wherein the mode information indicates either a coexistence mode or a normal mode for a current cell broadcasting the control header, and
wherein the frame allocation information indicates which frames are allocated to the current cell.

19. The apparatus of claim 18, wherein the control header includes at least one of a superframe number, quiet period information, an identifier of a current base station that is included in a CR wireless network and transmits the control header, a channel number indicates physical TV channel number used by the current base station, and a cyclic prefix factor specifying a size of a cyclic prefix in the superframe.

20. An apparatus for sharing a channel in an environment where a plurality of Cognitive Radio (CR) wireless networks coexist, the apparatus comprising:
a frame offset which indicates a start frame in one superframe, among a plurality of allocated frames,
wherein the apparatus constitutes a Superframe Control Header (SCH), in one superframe, comprising a frame allocation MAP for frame information allocated to the BS, with respect to each BS, and transmits and receives the SCH at the start frame of the allocated frames.

21. An apparatus for sharing a channel in an environment where a plurality of Cognitive Radio (CR) wireless networks coexist,
wherein the apparatus constitutes a Superframe Control Header (SCH), in one superframe, comprising a frame allocation MAP for frame information allocated to a Base Station (BS), with respect to each BS, mode information indicating either a coexistence mode or a normal mode for the BS, a superframe number, quiet period information, and an identifier of the BS, and transmits and receives the SCH using any frame of allocated frames.

22. An operating method of a Base Station (BS) for inter-frame resource sharing in an environment where a plurality of Cognitive Radio (CR) communication systems wireless networks coexist, the method comprising:
scanning for an available channel;
when there is no available channel, determining an occupation state of frames constituting a superframe with respect to a channel occupied by another CR wireless network;
determining an available frame in the superframe by taking into account the frame occupation state; and
transmitting a Superframe Control Header (SCH) which comprises information of at least one available frame determined, mode information indicating either a coexistence mode or a normal mode for the BS, a superframe number, quiet period information, and an identifier of the BS, over a corresponding frame of the superframe.

23. The method of claim 22, further comprising:
when the channel occupied by the other CR wireless network does not affect the BS, sharing the channel occupied by the other CR wireless network using a channel based coexistence mechanism.

24. The method of claim 22, wherein, when the BS occupies all of the frames of the superframe, frame allocation information of the BS is not contained in the SCH.

25. The method of claim 22, wherein, when all of the frames of the superframe are occupied with respect to the channel occupied by the other CR wireless network, an available frame is determined using a frame based coexistence mechanism, the mechanism comprising a frame renting/offering algorithm and a frame contention algorithm.

26. The method of claim 22, wherein the available frame is determined by taking into account a frame not affecting the BS among the frames of the superframe with respect to the channel occupied by the other CR wireless network.

27. An operating method of a Customer Premise Equipment (CPE) for inter-frame resource sharing in an environment where a plurality of Cognitive Radio (CR) wireless networks coexist, the method comprising:
determining one of a coexistence mode and a normal mode; and
in the coexistence mode, extracting frame allocation information from a corresponding frame within a superframe and determining at least one frame that is allocated in the superframe.

28. The method of claim 27, wherein the normal mode indicates that one CR wireless network occupies all of frames of the superframe, and the coexistence mode indicates that the plurality of the CR wireless networks shares the frame in the superframe.

* * * * *